US007216157B1

(12) United States Patent
Liu et al.

(10) Patent No.: US 7,216,157 B1
(45) Date of Patent: May 8, 2007

(54) METHOD AND SYSTEM FOR DISCOVERING MANAGED DEVICES IN A DATA NETWORK

(75) Inventors: David Liu, Raleigh, NC (US); David C. Bennett, Apex, NC (US)

(73) Assignee: VerizonBusinessGlobalLLC, Basking Ridge, NJ (US)

( * ) Notice: Subject to any disclaimer, the term of this patent is extended or adjusted under 35 U.S.C. 154(b) by 624 days.

(21) Appl. No.: 09/329,209

(22) Filed: Jun. 10, 1999

(51) Int. Cl.
*G06F 13/00* (2006.01)
(52) U.S. Cl. .................................................. 709/223
(58) Field of Classification Search ............... 709/223, 709/224, 225, 220
See application file for complete search history.

(56) References Cited

U.S. PATENT DOCUMENTS

| 5,821,937 A | * | 10/1998 | Tonelli et al. | ............... 345/853 |
| 5,909,549 A | * | 6/1999 | Compliment et al. | ....... 709/223 |
| 5,930,017 A | | 7/1999 | Davis et al. | |
| 6,360,260 B1 | * | 3/2002 | Compliment et al. | ....... 709/224 |
| 6,377,987 B1 | * | 4/2002 | Kracht | ........................ 709/220 |

OTHER PUBLICATIONS

Cliff McCollum "ptscan11.zip—SCANS IP addresses for active TCP/IP ports" Newsgroup: comp.archives.msdos.announc (Sep. 19, 1995) p. 1.*

SATAN (Security Analysis Tool for Auditing Networks) Frequently Asked Questions (FAQ) Apr. 2, 1995.*

Computer Networks and Internets by Comer; pp. 481-487.

* cited by examiner

*Primary Examiner*—Robert B. Harrell

(57) ABSTRACT

Network apparatuses, networks, computer program products, and management station operational methods are provided. One aspect of the invention provides a network apparatus including a management station adapted to couple with a network including a plurality of managed devices, the management station being configured to output a plurality of initial commands for application to respective managed devices, the initial commands being configured to stimulate initial responses from the managed devices, the management station being further configured to receive the initial responses, to identify responding ones of the managed devices responsive to the received initial responses, and to provide an asset table containing the identified managed devices. Another aspect provides a management station operational method including providing a network comprising a plurality of managed devices; outputting a plurality of initial commands to the managed devices using a management station to stimulate initial responses from the managed devices; receiving the initial responses from the managed devices using the management station; and identifying the managed devices using the management station responsive to the receiving the initial responses.

1 Claim, 3 Drawing Sheets

METHOD AND SYSTEM FOR DISCOVERING MANAGED DEVICES IN A DATA NETWORK

TECHNICAL FIELD

The present invention relates to network apparatuses, networks, computer program products, and management station operational methods.

BACKGROUND OF THE INVENTION

Computer networks are utilized in an ever-increasing number of applications to provide interconnection of numerous computer systems. Exemplary networks may be implemented as local area networks (LANs) and wide area networks (WANs). Networks are growing larger in size and more complex in nature in many applications.

Networks typically include a communication infrastructure of hundreds or thousands of devices such as routers, switches, hubs, concentrators, etc. Such communication infrastructures often comprise heterogeneous networks which individually include devices from numerous vendors which implement various technologies. The utilization of devices from numerous vendors may be advantageous for performance reasons and cost-effectiveness.

Management stations are provided in some conventional network configurations. Management stations are provided to manage and keep track of devices of the communication infrastructures. For example, management stations can be configured to obtain information of such devices as they enter and/or leave the associated network.

A management interface or management information base (MIB) supported by individual network devices is normally determined by the model, system software version and/or the manufacturer of the device. In many instances, the management interface or the management information base is particular to the individual device. For proper management of multi-vendor heterogeneous networks, it is often desired to determine the vendor, model and/or version of the individual network devices within the network being managed. Thereafter, the management station can apply a specific set of management commands (or MIBs) to manage the device.

In some conventional network configurations, such numerous network devices are logged by manual entry. Maintaining a data base of all network devices in a current updated condition requires a considerable amount of time and effort. For example, existing devices may experience hardware updates during implementation within the associated network. Furthermore, new devices may be added to the network and existing devices may be removed from the network at a given time. Maintaining an accurate and updated list of network devices is increasingly difficult and time-consuming in large existing networks which may include thousands of individual network devices. Manual updating of such data bases is susceptible to human error as well as other inaccuracies.

Therefore, a need exists in the art to provide improved structure and methodologies for analyzing and/or managing network systems.

SUMMARY OF THE INVENTION

The present invention provides network apparatuses, networks, computer program products, and management station operational methods. According to a first aspect, a network apparatus comprises: a management station adapted to couple with a network including a plurality of managed devices, the management station being configured to output a plurality of initial commands for application to respective managed devices, the initial commands being configured to stimulate initial responses from the managed devices, the management station being further configured to receive the initial responses, to identify responding ones of the managed devices responsive to the received initial responses, and to provide an asset table containing the identified managed devices.

Another aspect of the invention provides a network comprising: a plurality of managed devices configured to communicate signals; and a management station configured to output a plurality of initial commands to respective managed devices, the initial commands being configured to stimulate initial responses from the managed devices, the management station being further configured to receive the initial responses, to identify responding ones of the managed devices responsive to the received initial responses, and to provide an asset table containing the identified managed devices.

According to another aspect, the present invention provides a computer program product comprising: computer usable program code configured to cause a management station to communicate a plurality of initial commands to a plurality of managed devices of a network; computer usable program code configured to cause the management station to receive a plurality of initial responses from the managed devices; computer usable program code configured to cause the management station to identify responding ones of the managed devices; and computer usable program code configured to cause the management station to provide the identified ones of managed devices in an asset table.

Yet another aspect of the invention provides a management station operational method comprising: providing a network comprising a plurality of managed devices; outputting a plurality of initial commands to the managed devices using a management station to stimulate initial responses from the managed devices; receiving the initial responses from the managed devices using the management station; and identifying the managed devices using the management station responsive to the receiving the initial responses.

BRIEF DESCRIPTION OF THE DRAWINGS

Preferred embodiments of the invention are described below with reference to the following accompanying drawings.

FIG. 4 is a flow chart illustrating exemplary identification operations of the management station.

DETAILED DESCRIPTION OF THE PREFERRED EMBODIMENTS

Figure 1:
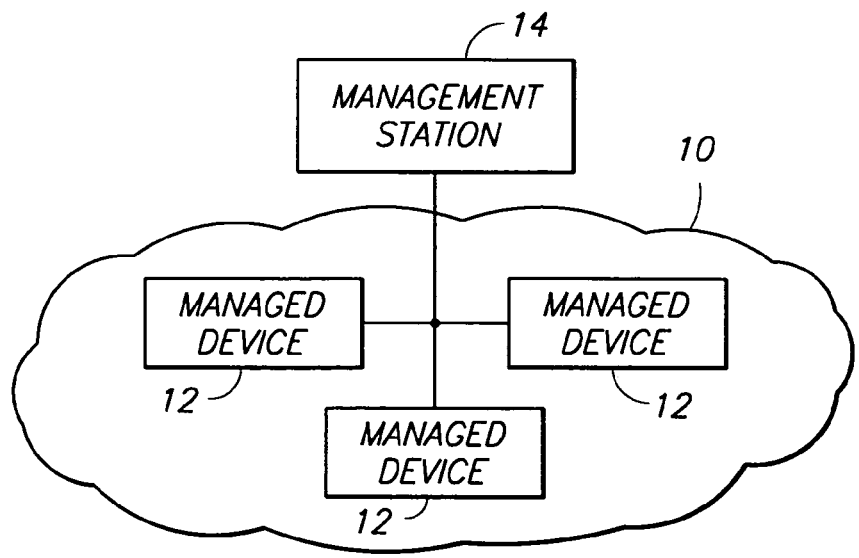
FIG. 1 is an illustrative representation of a managed service network and a management station.

Referring to FIG. 1, a managed service network 10 is illustrated. The depicted network 10 can comprise a local area network (LAN), wide area network (WAN) or other network configuration. Network 10 includes a plurality of managed devices 12 which form the communications infrastructure of managed service network 10. More or less numbers of managed devices 12 may be provided within network 10. Exemplary managed devices 12 include switches, routers, hubs, etc. configured to electrically communicate signals, such as data packets in the described embodiment. Managed devices 12 can be coupled with associated stations (not shown) such as personal computers, word processors, etc. Network 10 operates to connect such stations utilizing the communications infrastructure comprising managed devices 12.

In the described embodiment, network 10 comprises a multi-vendor heterogeneous network. More specifically, managed devices 12 are or may be provided from more than one vendor and individual managed devices 12 can have various models and versions in the described embodiment.

Management station 14 is configured as a network apparatus in the described embodiment to analyze and manage network 10. In particular, management station 14 is operable to monitor the presence and device type (e.g., vendor, model, version, etc.) of individual managed devices 12.

Managed devices 12 support respective management interfaces or management information bases (MIBs). The particular management interface or management information base supported by one of managed devices 12 is normally determined by the model, system software version and/or the manufacturer of the respective managed device 12. Accordingly, it is beneficial to identify and update as necessary the device types of managed devices 12. Once the device types of managed devices 12 are identified, management station 14 can apply specific sets of management commands (or MIBs) which correspond to the identified device types to manage the respective devices 12.

Management station 14 and managed devices 12 of network 10 are individually configured to execute a management program in accordance with the described embodiment. For example, management station 14 and individual managed devices 12 can execute a Simple Network Management Protocol (SNMP) management program. Exemplary network management operations are described in Douglas E. Corner, *Computer Networks and Internets* (2d ed. 1999), incorporated herein by reference.

In a Simple Network Management Protocol application, management station 14 is referred to as a manager and individual managed devices 12 are referred to as agents. Management station 14 and individual managed devices 12 are configured to communicate with one another using any appropriate transport protocol, such as Transmission Control Protocol/Internet Protocol (TCP/IP) communications.

Figure 2:
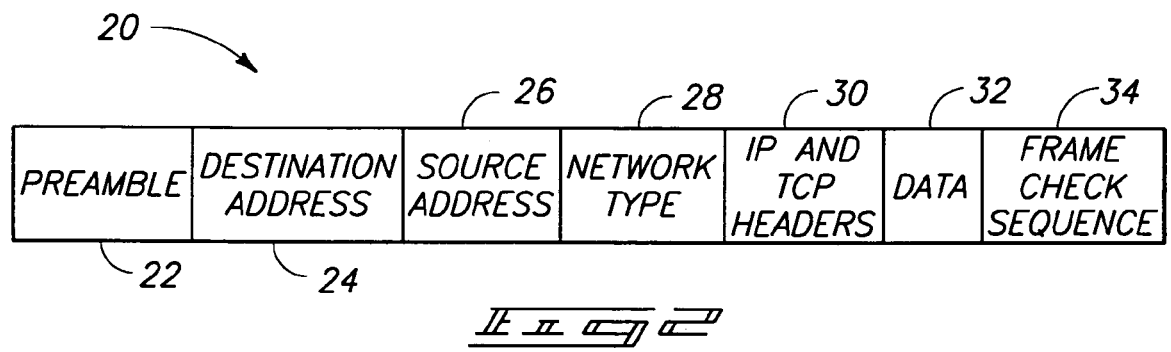
FIG. 2 is an illustrative representation of an exemplary frame for communications.

Referring to FIG. 2, an exemplary frame 20 for implementing packet-switched communications between management station 14 and managed devices 12 is shown. The depicted frame 20 is configured as an Ethernet frame. The depicted frame 20 illustrates communications according to one exemplary network communication protocol. Other frame constructions or formats may be utilized in other network communication configurations.

The depicted frame 20 includes a preamble field 22, destination address field 24, source address field 26, network-type field 28, IP and TCP header field 30, data field 32 and frame check sequence field 34. Management station 14 manages the associated network 10 and utilizes frames 20 to exchange information with individual managed devices 12. Similarly, individual managed devices 12 may utilize frames 20 to communicate with management station 14. For example, SNMP requests, SNMP responses and SNMP traps may be encoded in the IP and TCP header field 30 of frame 20. Exemplary communication exchanges intermediate management station 14 and managed devices 12 are described below.

Figure 3:
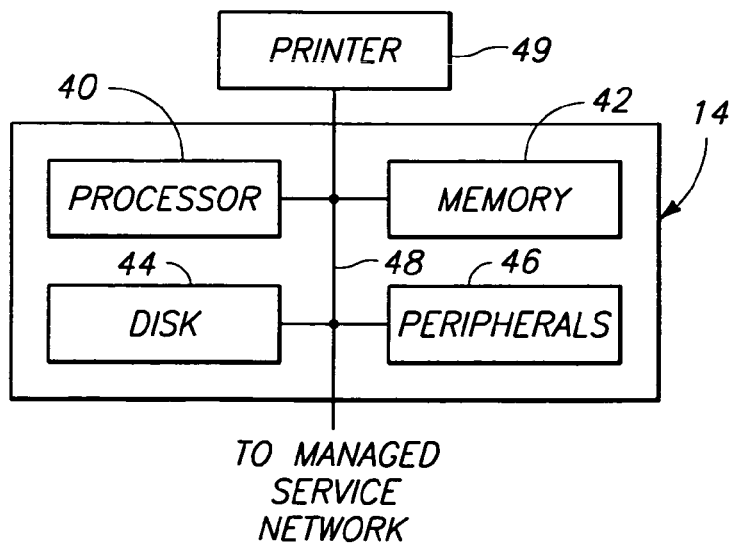
FIG. 3 is a functional block diagram of an exemplary configuration of the management station shown in FIG. 1.
Figure 2:
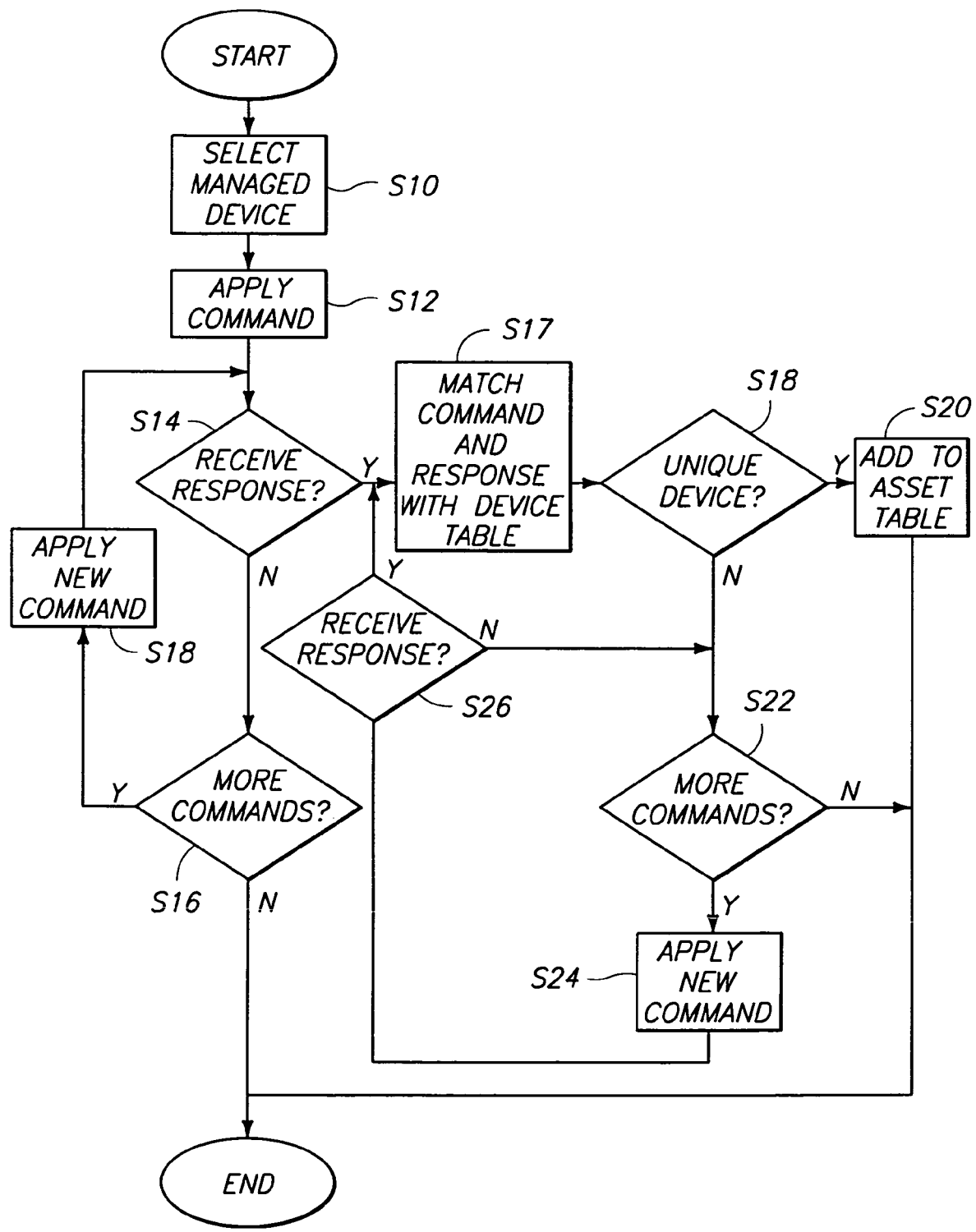

Referring to FIG. 3, one exemplary configuration of management station 14 is shown. The depicted management station 14 comprises a processor 40, memory 42, hard-disk drive 44 and associated peripherals 46. Processor 40, memory 42, hard-disk drive 44 and peripherals 46 are coupled with a system bus 48.

Hard-disk drive 44 can be configured to store computer usable program code which may be executed by processor 40. Additionally, peripherals 46 can include another disk drive configured to receive computer usable program code provided upon floppy disks. Other suitable devices and/or methodologies may he utilized to supply computer usable program code to processor 40 for execution.

A printer 49 is coupled with system bus 48. Printer 49 may be utilized to output an asset table generated as described below or other operations of management station 14. Such an asset table includes polled nodes and respective device types associated with such nodes for a given managed service network 10. System bus 48 is further coupled with managed service network 10 of FIG. 1. A network interface card (not shown) may be utilized for such coupling.

In one exemplary embodiment, hard-disk drive 44 includes a management program, such as the Simple Network Management Protocol management program, to provide management of managed devices 12 of network 10. Management station 14 configured in accordance with the present invention is operable to identify individual managed devices 12 of managed service network 10. Management station 14 communicates with network 10 using frames 20 and system bus 48 to implement identification operations.

A node table (not shown) corresponding to individual managed devices 12 of the associated network 10 being managed is provided to management station 14. The node table lists addresses for individual associated managed devices 12 corresponding to respective nodes. Exemplary addresses include Internet Protocol addresses.

Individual node tables correspond to respective networks. Management station 14 utilizes the node tables to poll managed devices 12 within the associated network 10. Management station 14 implements such polling operations in an attempt to identify managed devices 12 of network 10.

Referring to FIG. 4, a flow chart illustrates one process for polling individual managed devices 12 of network 10. The depicted flow chart is implemented for individual managed devices 12 which are desired to be identified. The illustrated flow chart is implemented as computer usable program code stored within hard-disk drive 44 in an exemplary embodiment. Processor 40 is configured to access and execute such program code to identify managed devices 12. Other implementations of the described process are possible.

Initially, at step S10, management station processor 40 selects a managed device 12 of network 10 to be analyzed. The selected managed device 12 is provided within the node table of the associated network 10 in the described embodiment. In one configuration, processor 40 sequentially proceeds through the node table to analyze individual managed devices 12.

Following the selection of one managed device 12 of network 10 at step S10, processor 40 proceeds to step S12 and applies an appropriate initial command to the selected managed device 12 using an address for the device from the node table. As described further below, the command is ideally chosen in the described embodiment to stimulate a response from the polled managed device 12. More specifically, the command is ideally chosen to stimulate a response which uniquely identifies the currently polled managed device 12.

At step S14, processor 40 determines whether a response from the polled managed device 12 was received responsive to the initial command. If not (e.g., the response fails), processor 40 proceeds to step S16 to determine whether more commands are available for application to the currently polled managed device 12. Such may be necessary if the currently polled managed device 12 does not support the initial command. If at least one new command is available, processor 40 applies such subsequent command at step S18 to the managed device 12. Thereafter, processor 40 again awaits a response at step S14.

If no more commands are available at step S16, processor 40 ends the interrogation or polling of the current managed device 12. Thereafter, a manager or operator may attempt to manually ascertain the identification of the previously polled managed device 12.

Alternatively, if a response is received at step S14 responsive to an applied initial or subsequent command, processor 40 compares the command and received response with device type data within a device table or device knowledge data base in an attempt to match the command and response with a device type at step S17. An exemplary device table or device knowledge data base is illustrated below as Table B. Such includes descriptive information associated with each device type. For example, entries exist for individual device types which specify the associated SNMP sysObjectID value, the vendor manufacturing the device, the model of the device, and the hardware category (e.g., router or switch) of the device.

Such matching can either directly indicate the device type of the currently polled managed device 12 or provide an indication that further polling is required to accurately and completely identify the currently polled managed device 12.

More specifically, it is determined whether a unique device was determined from the matching of the command and the response with the device knowledge data base at step S18. If the responding managed device 12 can be identified as a unique device, processor 40 proceeds to step S20 to add the currently polled managed device 12 to an asset table (not shown). The asset table captures the results from the polling of managed devices 12. The asset table includes the device types of managed devices 12 and the associated nodes of network 10. The asset table provides a summary of the managed network.

If the response received at step S14 fails to identify a unique device at step S18, processor 40 proceeds to step S22 to determine whether more commands are available to poll the current managed device 12. Processor 40 ends the interrogation of the current managed device 12 if no more commands are available. The manager or operator may thereafter manually attempt to determine the identification of the managed device 12. Once determined, the device type may be provided within the asset table and associated proper The device type and signature (e.g., command and corresponding response) can also be provided within a state transition table (described below) and the device table or device knowledge data base for future comparison of subsequently analyzed managed devices 12.

Alternatively, if more commands are available for interrogation as determined at step S22, processor 40 proceeds to step S24 to apply a new subsequent command to the currently polled managed device 12. Next, processor 40 proceeds to step S26 to monitor for the reception of a response from the polled managed device 12. If no response is received at step S26, processor 40 proceeds to step S22. If a response is received at step S26, processor 40 proceeds to step S17 in an attempt to match the received response and associated command with an entry of the device table as described above. Thereafter, processor 40 proceeds to step S18 to determine whether any matching resulted in the identification of a unique device type for the currently polled managed device 12 as previously described.

Following completion of the flow chart for the currently polled managed device, processor 40 of management station 14 proceeds to the next node and corresponding address and performs the flow chart again to attempt to determine the device type of the next associated managed device 12. Such can occur until all nodes and associated managed devices are analyzed.

Management station 14 can manage devices 12 following identification operations. For example, hard-disk drive 44 can additionally include computer usable program code configured to cause management station 14 to apply one or more management commands to identified managed devices 12. Such applied management commands individually correspond to the identified device types of managed devices 12.

The flow chart steps of FIG. 4 are implemented within processor 40 of management station 14 comprising a finite state machine in one exemplary configuration. An example of a state transition table for discovering a device type for a currently polled managed device 12 is shown below in Table A. The "%" character represents a wild card pattern which matches any number of characters in the described example.

TABLE A

| State ID | Command | Response | Next Action |
|---|---|---|---|
| 1 | snmpget system.sysObjectID.0 | like '%.cisco.%' | Lookup |
| 2 | snmpget system.sysObjectID.0 | like '%.wellfleet.%' | Goto 10 |
| 3 | snmpget system.sysObjectID.0 | like '%.3Com.%' | Lookup |
| ... | snmpget system.sysObjectID.0 | <failed> | Goto 21 |
| 10 | snmpget wfSwSeries7.wfHardwareConfig. wfH2Base.wfHwBpldOpt.0 | like '[0–9]+' | Lookup |
| ... | | | |
| 21 | snmpget sunSystem.agentDescr.0 | like '%SPARC%' | Lookup |
| ... | | | |

Table A includes state identifications, commands, responses and next actions in respective columns as illustrated. The command values indicated in the second column correspond to selected commands within management station 14 for application to a currently polled managed device 12. Such commands may be considered as triggers within a finite state machine.

The finite state machine begins with state 1 for individual managed devices 12 being analyzed. The commands are selected with the aim of triggering or stimulating responses from the managed devices 12 which uniquely identify the responding managed devices 12. For example, the "snmpget system.sysObjectID.0" command indicated in state 1 triggers a unique response in numerous device types which may be implemented within the communication infrastructure of network 10.

Table A also indicates responses or identifiers in the third column which correspond to the appropriate command. The command and associated response provide a signature for the currently polled managed device 12. Based upon the command and response, a next state in the finite state machine is determined.

The polling of an exemplary managed device 12 is described next. Initially, management station 14 outputs the command indicated in the first row of Table A corresponding to the first state. If a response from the currently polled managed device 12 includes the character string "%.cisco.%", processor 40 performs a Lookup function as indicated in the fourth column of Table A.

The signature (i.e., command and response) of a currently polled managed device 12 corresponding to the first row indicates a Lookup function is appropriate in an attempt to determine the device type of the managed device 12. More specifically, following a signature of the command and response of the first state identification for a currently polled managed device 12, processor 40 utilizes a device table in an attempt to derive a device type for the currently polled managed device 12.

An exemplary device table or device knowledge data base is illustrated below as Table B.

TABLE B

| Device Index | Command | Response | Vendor | Model |
|---|---|---|---|---|
| cisco4500 | snmpget system.sys ObjectID.0 | .iso.org.dod.internet .private.enterprises. cicso.products.14 | Cisco Systems, Inc. | 4500 |
| cisco7000 | snmpget system.sys ObjectID.0 | .iso.org.dod.internet .private.enterprises. cisco.products.8 | Cisco Systems, Inc. | 7000 |
| . . . | | | | |
| 3com | snmpget system.sys ObjectID.0 | .920.org.dod.internet .private.enterprises. 13Com.products.bro uter.11 | 3Com Corp. | nb2_4 |
| 3com | snmpget system.sys ObjectID.0 | .iso.org.dod.internet .private.enterprises. a3Com.products.bro uter.13 | 3Com Corp. | nbro |
| . . . | | | | |
| wellfleet_ ACECN | snmpget wfSwSeries7. wfHardware Config.wfHw Base.wfHw BpldOpt.0 | 1 | Bay Networks Inc. | ACECN switch |
| . . . | | | | |
| sunSparc | snmpget sunSystem. agentDescr.0 | Sun SNMP Agent, SUNW,SPAR Cstation-20 | Sun Micro- systems Inc. | Sparc |
| . . . | | | | |

Using the signature corresponding to the first state identification, processor 40 can ascertain that the currently polled managed device 12 is a Cisco 4500 or Cisco 7000 from the depicted device table. Processor 40 utilizes the response to ascertain the appropriate device type of the device table. For example, the Cisco 4500 and Cisco 7000 are possible device types for the currently polled managed device 12 inasmuch as the received response includes the "%.cisco.%" string.

Further, the response typically includes further information which identifies the particular one of the two indicated Cisco device possibilities. In other words, processor 40 initially searches for the "%.cisco.%" string to determine that a Lookup is appropriate. Thereafter, processor 40 utilizes the entire response to identify the particular device type. For example, an exemplary entire response to a command being ".iso.org.dod.internet.private.en-terprises.cisco.products.8" would indicate that the currently polled managed device 12 has a device type of Cisco 7000.

The asset table is thereafter updated by processor 40 to include the identified device type for the currently polled managed device 12.

Obtaining a signature (i.e., initial command and initial response) corresponding to the second state identification of Table A, processor 40 proceeds to state identification 10 of the Table A and issues a subsequent command for application to a currently polled managed device 12. The signature of identification state 2 indicates a group of device types without specifically identifying the exact model and manufacturer (i.e., no unique device is determined from the initial signature). Accordingly, processor 40 proceeds to state identification 10 in search of such information and issues the subsequent indicated command to the currently polled managed device 12.

Following the receipt of a response such as "[0–9]+" following the issuance of the subsequent command of state identification 10, processor 40 again proceeds to the device table of Table B to identify the currently polled device 12 as an ACECN switch available from Bay Networks, Inc. The asset table is thereafter updated by processor 40 to include the identified device type for the currently polled managed device 12.

Referring to the fourth state identification of Table A, a "failed" response is indicated responsive to the associated initial command. Such may indicate that the particular device type currently being polled does not support the command. In such a situation, processor 40 proceeds to state identification 21 to issue the indicated command. Thereafter, following reception of a "%SPARC%" string, processor 40 can perform a Lookup function of the device table to determine the device type of the currently polled managed device 12. Such would indicate a Sparc model available from Sun Microsystems, Inc. Accordingly, the associated asset table is updated by processor 40 to include the device type of the currently polled managed device 12.

Figure 5:
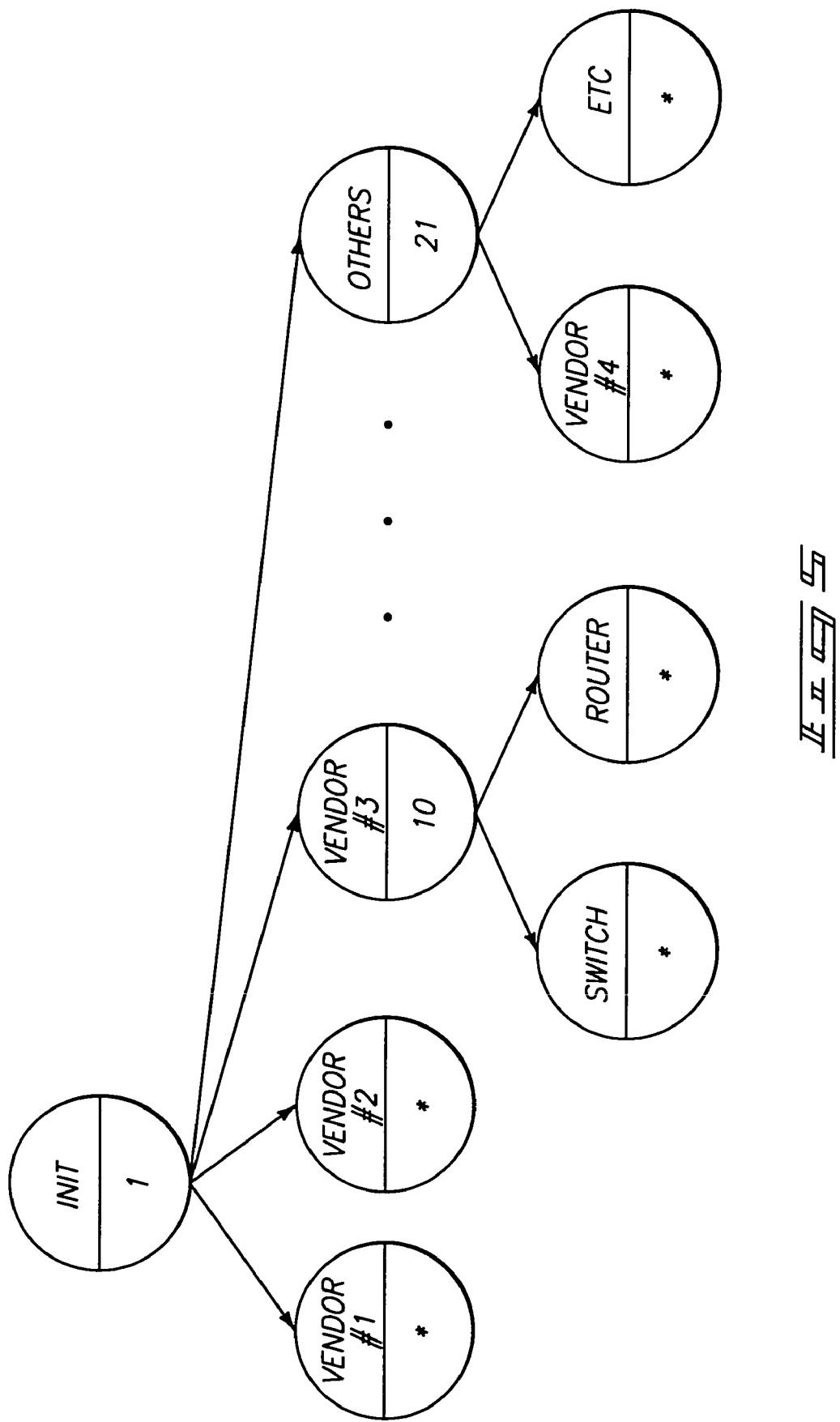
FIG. 5 is a state diagram corresponding to the identification operations of FIG. 4.

Referring to FIG. 5, a state diagram for the illustrated exemplary identification operations is shown. The depicted state diagram corresponds to the state transition table of Table A and the device table of Table B. A first, second or third vendor is ideally identified following the response to an issued command from the first state identification. Vendor No. 1 can correspond to Cisco Systems, Inc. and Vendor No. 2 can correspond to 3Com Corp. for consistency with the above tables.

Identification of Vendor No. 3 (e.g., Bay Networks, Inc.) following the initial state causes the issuance of a subsequent command from state identification 10 to determine whether the device is a switch or router of the indicated vendor.

The indicated state 21 is entered following the receipt of a failed indication responsive to the initial command. Such can lead to the identification of the appropriate Vendor No. 4 (e.g., Sun Microsystems, Inc.) or, alternatively, no identification of the currently polled managed device 12. A manger or operator may attempt to manually determine the device type of the currently polled managed device 12 if no identification is ascertained by the finite state machine. Such manually determined device type may be added to the device table or device knowledge data base and the asset table.

The protection sought is not to be limited to the disclosed embodiments, which are given by way of example only, but instead is to be limited only by the scope of the appended claims as properly interpreted in accordance with the doctrine of equivalents.

The invention claimed is:

1. A computer program product comprising:

computer usable program code configured to cause a management station to communicate a plurality of initial commands to a plurality of managed devices of a network;

computer usable program code configured to cause the management station to identify the managed devices based upon a plurality of initial responses from the managed devices;

computer usable program code configured to cause the management station to transmit subsequent commands to the responding ones of the managed devices if the identities are not determined, wherein the subsequent commands are different from the initial commands;

computer usable program code configured to cause the management station to provide an asset table containing the identified managed devices;

computer usable data including a state transition table including a plurality of identifiers; and, computer usable program code configured to cause the management station to compare the received initial responses with the identifiers to identify the device types of the respective responding managed devices.

* * * * *